United States Patent
Schunk et al.

(10) Patent No.: US 7,112,902 B2
(45) Date of Patent: Sep. 26, 2006

(54) DRIVE APPARATUS FOR A PLASTICS PROCESSING MACHINE

(75) Inventors: Holger Schunk, Lendershausen (DE); Andreas Tschanter, Heustreu (DE); Peter Kress, Alsleben (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/032,686

(22) Filed: Jan. 10, 2005

(65) Prior Publication Data

US 2005/0163641 A1  Jul. 28, 2005

Related U.S. Application Data

(63) Continuation of application No. PCT/DE03/02188, filed on Jul. 1, 2003.

(30) Foreign Application Priority Data

Jul. 9, 2002  (DE) ............................... 102 30 876

(51) Int. Cl.
  *H02K 5/16* (2006.01)
(52) U.S. Cl. .......................... 310/90; 310/89
(58) Field of Classification Search ............ 310/89–90; 366/83, 100; 425/558–261
  See application file for complete search history.

(56) References Cited

U.S. PATENT DOCUMENTS 5,679,384 A * 10/1997 Emoto ......................... 425/145
5,891,485 A * 4/1999 Emoto ......................... 425/145
6,632,009 B1 * 10/2003 Meyer ......................... 366/100
6,916,169 B1 * 7/2005 Okada ......................... 425/593
2002/0168445 A1 * 11/2002 Emoto et al. ................ 425/558

FOREIGN PATENT DOCUMENTS

| DE | 44 30 176 A | 2/1996 |
| DE | 199 09 307 A1 | 9/1999 |
| DE | 697 03 535 T2 | 6/2001 |
| DE | 100 28 066 C1 | 12/2001 |
| DE | 200 22 605 U1 | 1/2002 |
| EP | 1 182 027 A | 2/2002 |

OTHER PUBLICATIONS

"Ohne Getriebe", Plastverarbeiter, Zechner und Huethig Verlag GmbH. Speyer/Rhein, DE, vol. 53, No. 9, Sep. 2002, pp. 84-85, XP001116280 ISSN: 0032-1338.

* cited by examiner

*Primary Examiner*—Thanh Lam
(74) *Attorney, Agent, or Firm*—Henry M. Feirereisen

(57) ABSTRACT

A drive apparatus unit for components of a plastics processing machine includes a motor unit which is provided with a rotor having a hollow shaft, and a thrust bearing assembly for mounting a driveshaft of the plastics processing machine. The thrust bearing assembly is fully or partly disposed within the hollow shaft. By arranging the thrust bearing assembly within the hollow shaft, the size of the drive apparatus is reduced to the size of the motor unit.

22 Claims, 2 Drawing Sheets

DRIVE APPARATUS FOR A PLASTICS PROCESSING MACHINE

CROSS-REFERENCES TO RELATED APPLICATIONS

This application is a continuation of prior filed copending PCT International application no. PCT/DE2003/002188, filed Jul. 1, 2003, which designated the United States and on which priority is claimed under 35 U.S.C. §120, and which claims the priority of German Patent Application, Serial No. 102 30 876.4, filed Jul. 9, 2002, pursuant to 35 U.S.C. 119(a)–(d).

BACKGROUND OF THE INVENTION

The present invention relates, in general, to a plastics processing machine, and more particularly to a drive apparatus for a plastics processing machine.

Nothing in the following discussion of the state of the art is to be construed as an admission of prior art.

German Pat. No. DE 100 28 066 C1 discloses an injection unit which is driven by two electric motors disposed in alignment to one another. One electric motor acts via a threaded nut upon the driveshaft of a screw to cause a translational movement, whereas the other electric motor acts upon a driving pin to cause a rotational movement of the driveshaft. A coupling is disposed between the motor shafts of both motors, with both motor shafts constructed as hollow shafts which are rotatably mounted on the housing of the injection unit. Respective bearings are provided on the respective hollow shafts.

German patent publication no. DE 199 09 307 A1 discloses a production machine with electric drives for use in the plastics industry. The production machine, e.g. an injection molding machine, extruder, or blow molding machine, includes an electric drive for moving a material feed element, with at least one of the electric drives being constructed as direct electric drive. The electric motor may be implemented as synchronous motor or asynchronous motor. A hollow shaft for receiving the driveshaft of an extruder screw for example projects through the rotor of the electric motor.

It would be desirable and advantageous to provide an improved drive apparatus which is compact and is constructed for easy disassembly, if need be, and yet is reliable in operation.

SUMMARY OF THE INVENTION

According to one aspect of the present invention, a drive apparatus for a plastics processing machine includes a motor unit having a hollow shaft for support of a rotor, a face plate attached to one end surface of the motor unit, and a thrust bearing assembly mounted to the face plate for support of a driveshaft of the plastics processing machine, wherein the thrust bearing assembly is disposed, at least partially, in the hollow shaft in coaxial relationship thereto.

The present invention resolves prior art problems by providing a drive apparatus which is limited in size and thus compact in view of the integration of the thrust bearing assembly in the rotor, and by constructing the thrust bearing assembly in such a way as to allow a simple dismantling of, for example, an extruder screw, when the plastics processing machine is an extruder. Through simple removal of the thrust bearing assembly from the hollow shaft, the extruder screw can be drawn through the hollow shaft, without requiring a disassembly of the motor itself from the plastics processing machine. This is advantageous not only when, e.g. the extruder screw becomes clogged so that repair work is necessary, but also for maintenance works. The accommodation of at least part of the thrust bearing assembly also protects the thrust bearing assembly from contamination.

According to another feature of the present invention, a transmission unit can be placed between the hollow shaft and the driveshaft for transmitting the torque from the rotor to the driveshaft unit, with the transmission unit including a flange having a tubular portion which projects into the hollow shaft, wherein the flange can be mounted to an end surface of the hollow shaft. As the thrust bearing is disposed in the motor unit and, in relation to the tip of the extruder screw, behind the transmission unit, the driveshaft may project into the hollow shaft. In this way, the torque can be transmitted directly onto the driveshaft of, e.g., the extruder shaft, and the thrust bearing can be constructed as plain abutment. This modular construction of the motor unit and the thrust bearing assembly permits a simple exchange of the bearing assembly, if needed for example in order to satisfy particular requirements such as high axial pressures. For example, a simple thrust bearing can easily be replaced by a tandem bearing which is able to resist much higher axial loads.

According to another feature of the present invention, the thrust bearing assembly can be detachably secured to a motor housing. An example of such securement involves a bolting of the thrust bearing assembly to the motor housing.

According to another feature of the present invention, a sealing element may be provided for the hollow shaft for protecting the thrust bearing assembly, positioned therebehind, against contamination.

According to another feature of the present invention, the transmission unit may include a bushing received in the flange in driving relationship with the driveshaft, e.g. via a tooth system. By configuring the transmission unit in this way, the bushing can be pulled out of the flange to allow a withdrawal of, e.g., the entire extruder screw rearwards through the flange and through the hollow shaft of the motor unit.

The integration of the thrust bearing assembly in the motor unit can be implemented in many types of different plastics processing units, e.g. extruder, injection molding machine, or blow molding machine, thereby considerably reducing repair or maintenance works.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the drawings are not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
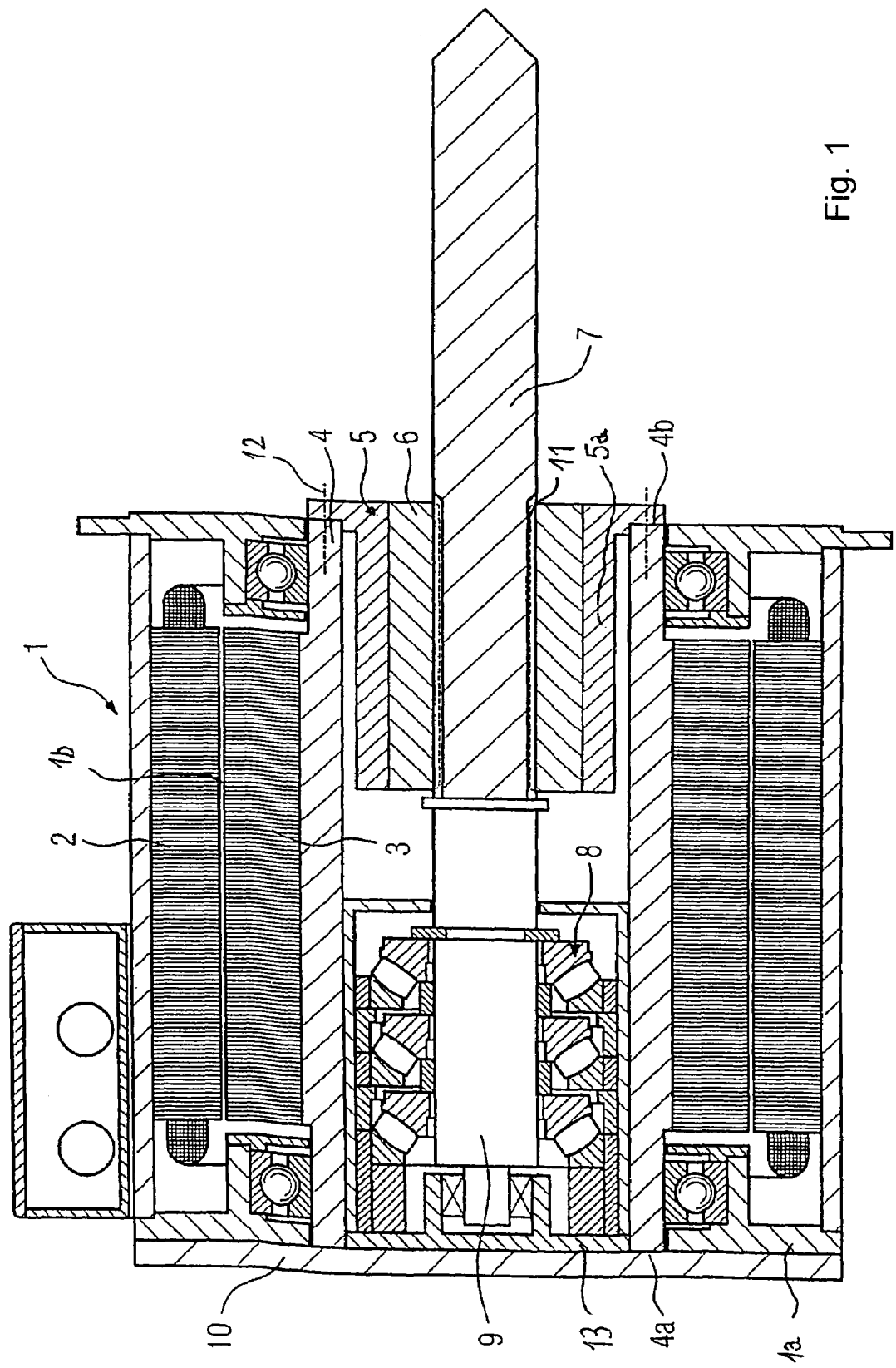
FIG. 1 is a sectional view of a drive apparatus according to the present invention incorporated by way of example in an extruder for operating an extruder screw.
Figure 2:
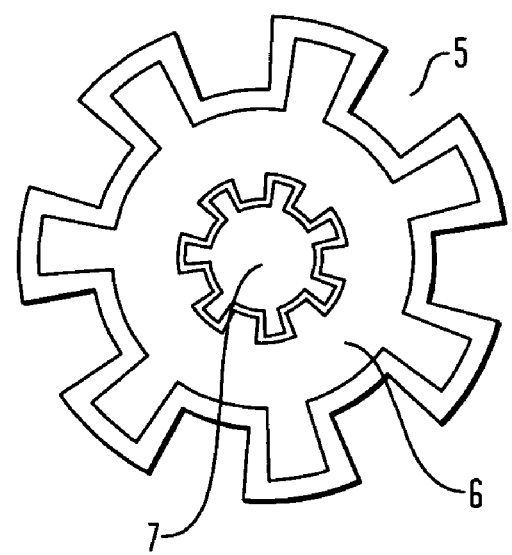
FIG. 2 is a schematic illustration of a detail of the drive apparatus of FIG. 1.
Figure 1:
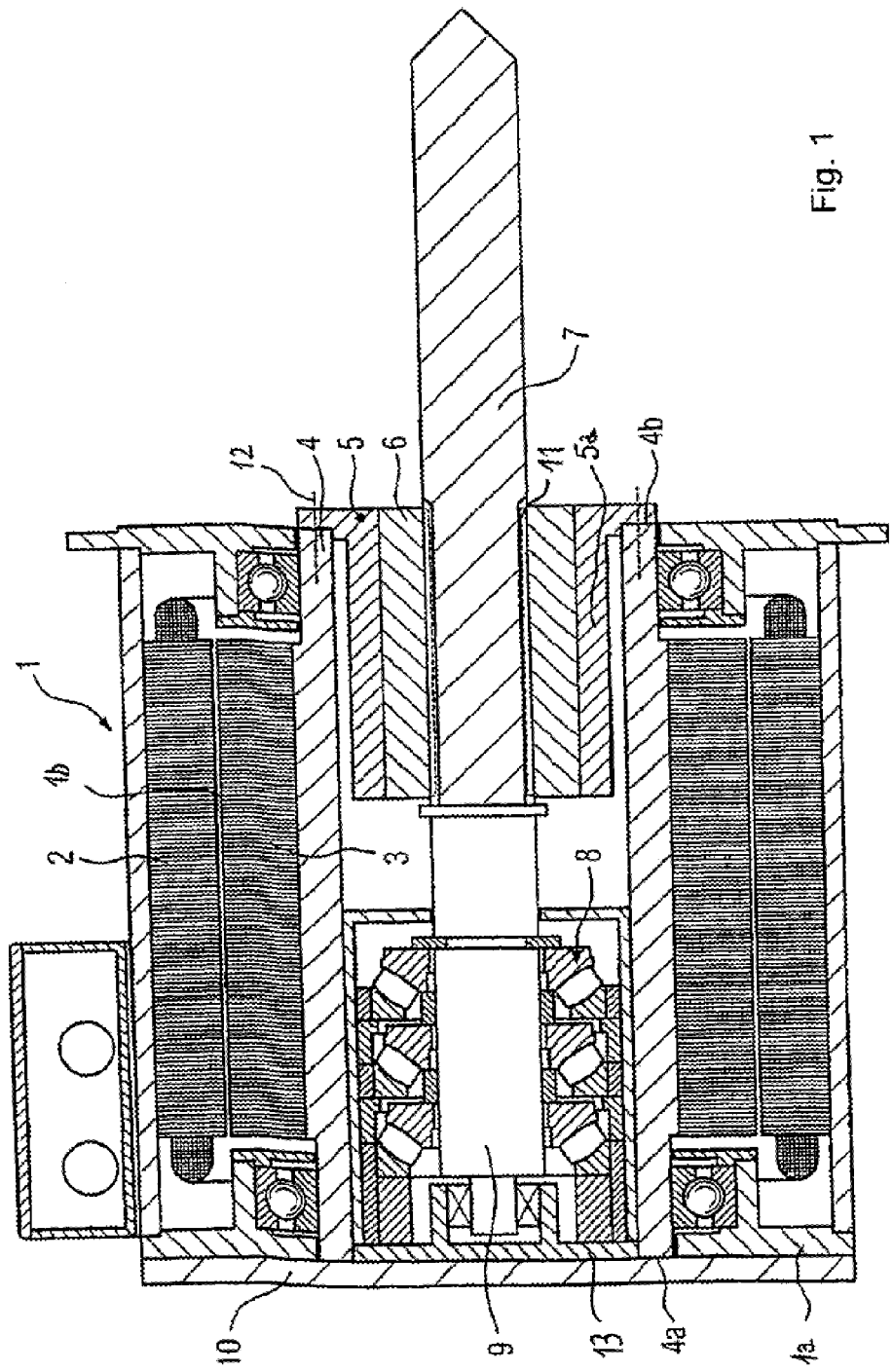
Figure 2:
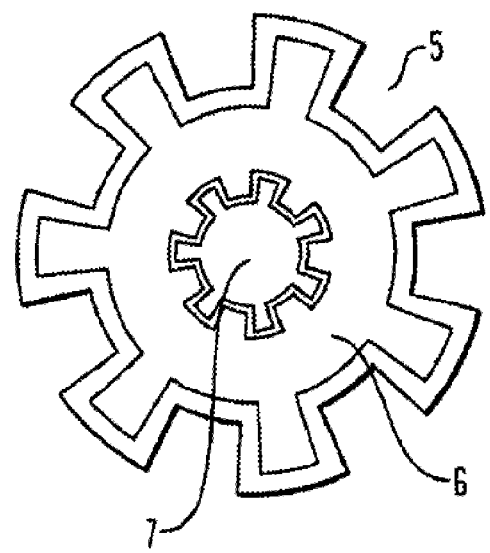

Turning now to FIG. 1, there is shown a sectional view of a drive apparatus according to the present invention in the form of a direct drive for operating, for example, an extruder screw an extruder. The dive apparatus includes a motor unit 1 having a housing 1a to accommodate a stator 2 and a rotor 3 which interacts with the stator 2 via an air gap 1b. The rotor 3 is hereby supported on a hollow shaft 4 which extends across the interior of the housing 1a. As indicated by dashdot lines 12, a flange 5 is bolted to one end surface 4b of the hollow shaft 4 and has a tubular portion 5a that projects into the hollow shaft 4. The flange 5 forms part of a transmission unit whose other part is a bushing 6 which is received in force-fitting manner in the flange 5 for transmitting a torque from the motor unit 1 onto a driveshaft 7 of the extruder screw, with the driveshaft 7 disposed in force-fitting manner in the bushing 6. The driveshaft 7 is received in the bushing 6 for axial movement and is connected to the hollow shaft 4 via a tooth system 11. Thus, the torque of the hollow shaft 4 is transmitted via the flange 5 and the bushing 6 of the transmission unit to the driveshaft 7. An example of a currently preferred connection between the flange 5 and the bushing 6 as well as between the bushing 6 and the driveshaft 7 is shown in FIG. 2. As can be seen in FIG. 2, splined connections are provided between the flange 5 and the bushing 6 and between the bushing 6 and the driveshaft 7 and so configured as to allow a torque transmission as well as an axial displacement.

Disposed within the hollow shaft 4 on the flange-distal side 4a thereof is a thrust bearing assembly, generally designated by reference numeral 8 and providing an abutment for the driveshaft 7. The thrust bearing assembly 8 resists axial forces which are transmitted by the extruder screw onto the driveshaft 7. In the exemplified configuration shown in FIG. 1, the axial bearing assembly 8 is constructed as tandem bearing assembly with three bearing units. As a result, the thrust bearing assembly 8 obtains a greater mechanical strength and thus is able to resist higher axial loads while still retaining a relatively small bearing diameter. Rotatably supported within the thrust bearing assembly 8 in coaxial relationship with the hollow shaft 4 is a shaft stub 9 which juts out of the axial bearing assembly 8 towards the driveshaft 7 to terminate in an end surface for providing the abutment and axial support of the driveshaft 7.

On its side distal to the extruder screw, the motor unit 1 is closed by a face plate 10 which is secured to the housing 1a of the motor unit 1. The thrust bearing assembly 8 is mounted in the area of the interior space of the hollow shaft 4 to the face plate 10. The face plate 10 and the flange 5 together effectively protect the thrust bearing assembly 8 from both sides against contamination. Suitably, the end of the hollow shaft 4 adjacent to the face plate 10 is further sealed by a sealing element 13 to further assist the protection of the thrust bearing assembly 8 against contamination.

The drive apparatus according to the present invention allows easy replacement of the thrust bearing assembly 8, on one hand, and withdrawal of the extruder screw through the flange 5 and the hollow shaft 4 from the motor unit 1 in rearward direction. Replacement of the thrust bearing assembly 8 can be realized by detaching the face plate 10 from the housing 1a of the motor unit 1 to access the thrust bearing assembly 8 which can then be easily pulled out together with the shaft stub 9 from the interior space of the hollow shaft 4. The modular construction of the drive apparatus according to the present invention enables the application of this direct drive with the hollow shaft 4 for many different machine types that require different bearings.

In the event, the extruder screw should be removed from the extruder, for example because of clogging or for maintenance works, a withdrawal is normally possible only by pulling the extruder screw rearwards through its channel. As the thrust bearing assembly 8 can easily be extracted from the hollow shaft 4, the extruder screw can now be withdrawn through the hollow shaft 4, without any need to dismantle the motor unit 1 from the extruder. The bushing 6 can be pushed out of the flange 5 to allow the withdrawal of the extruder screw.

The modular construction of the motor unit 1 and thrust bearing assembly 8 has thus the advantage of realizing a simple extraction of the thrust bearing assembly 8 or the extruder screw or any other rotating component of the direct drive. Moreover, the drive apparatus according to the invention is compact as the thrust bearing assembly 8 is fitted within the hollow shaft 4 of the motor unit 4 so that the dimensions of the direct drive correspond to the dimensions of the motor unit 1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive apparatus for a plastics processing machine, comprising:
   a motor unit having a hollow shaft for support of a rotor;
   a face plate attached to one end surface of the motor unit; and
   a thrust bearing assembly mounted to the face plate for support of a driveshaft of the plastics processing machine, said thrust bearing assembly being disposed, at least partially, in the hollow shaft in coaxial relationship thereto.

2. The drive apparatus of claim 1, wherein the thrust bearing assembly is disposed entirely in the hollow shaft.

3. The drive apparatus of claim 1, wherein the thrust bearing assembly includes a tandem bearing.

4. The drive apparatus of claim 1, and further comprising a shaft stub rotatably supported in the thrust bearing assembly for providing an abutment for the driveshaft which is disposed in axial alignment with the shaft stub.

5. The drive apparatus of claim 1, wherein the motor unit has a motor housing, said thrust bearing assembly being detachably secured to the motor housing.

6. The drive apparatus of claim 5, wherein the thrust bearing assembly is bolted to the motor housing.

7. The drive apparatus of claim 1, and further comprising a transmission unit placed between the hollow shaft and the driveshaft for support and propulsion of the driveshaft, said transmission unit including a flange having a tubular portion which projects into the hollow shaft, said flange being mounted to the hollow shaft.

8. The drive apparatus of claim 7, wherein the flange is bolted to an end surface of the hollow shaft.

9. The drive apparatus of claim 1, and further comprising a sealing element for sealing the hollow shaft to protect the thrust bearing assembly against contamination.

10. The drive apparatus of claim 7, wherein the transmission unit includes a bushing received in the flange in driving relationship with the driveshaft.

11. The drive apparatus of claim 10, wherein the bushing is operatively connected to the driveshaft via a tooth system.

12. The drive apparatus of claim 1, wherein the plastics processing machine is an extruder having an extruder screw, said driveshaft being operatively connected to the extruder screw.

13. The drive apparatus of claim 12, wherein the motor unit is constructed as synchronous motor as direct drive for the extruder.

14. The drive apparatus of claim 1, wherein the plastics processing machine is an injection molding machine having a clamping unit, said driveshaft being operatively connected to the clamping unit.

15. A set of modular elements for the construction of a drive apparatus for a plastics processing machine, said set comprising:
- a motor unit including a housing defining an interior space, and a hollow shaft which extends across the interior space of the housing and supports a rotor interacting with a stator across an air gap;
- a transmission unit, received in the hollow shaft at one end thereof, for transmitting a torque from the motor unit onto a driveshaft of a plastics processing machine;
- a thrust bearing assembly, received in the hollow shaft at another end thereof in coaxial relationship thereto, for supporting a shaft stub having an end portion to provide an abutment for the driveshaft; and
- a face plate detachably secured to the housing in confronting relationship to the thrust bearing assembly.

16. The set of claim 15, wherein the transmission unit includes a flange detachably secured to the hollow shaft and a bushing received in the flange and constructed in driving relationship with the driveshaft.

17. An extruder, comprising:
- an extruder screw; and
- a drive apparatus for operating the extruder screw, said drive apparatus including a motor unit having a rotor with a hollow shaft in driving relationship with the extruder screw, a face plate attached to one end surface of the motor unit, and a thrust bearing assembly mounted to the face plate for support of the extruder screw and disposed, at least partially, in the hollow shaft in coaxial relationship thereto.

18. The extruder of claim 17, and further comprising a transmission unit placed between the hollow shaft and the driveshaft for support and propulsion of the extruder screw, said transmission unit including a flange having a tubular portion which projects into the hollow shaft, said flange being mounted to the hollow shaft.

19. The extruder of claim 18, wherein the transmission unit includes a bushing received in the flange in driving relationship with the extruder screw.

20. The extruder of claim 19, wherein the bushing and the extruder screw cooperate via a tooth system.

21. The extruder of claim 17, wherein the extruder screw is partially received in the hollow shaft.

22. An injection molding machine, comprising a clamping unit for an injection mold; and a drive apparatus including a motor unit having a rotor with a hollow shaft, a face plate attached to one end surface of the motor unit, and a thrust bearing assembly mounted to the face plate for support of a driveshaft for the clamping unit, and disposed, at least partially, in the hollow shaft in coaxial relationship thereto.

* * * * *

UNITED STATES PATENT AND TRADEMARK OFFICE
CERTIFICATE OF CORRECTION

| | | |
|---|---|---|
| PATENT NO. | : 7,112,902 B2 | Page 1 of 7 |
| APPLICATION NO. | : 11/032686 | |
| DATED | : September 26, 2006 | |
| INVENTOR(S) | : Holger Schunk et al. | |

It is certified that error appears in the above-identified patent and that said Letters Patent is hereby corrected as shown below:

Delete title pages, showing and substitute therefore the attached title page.
Delete Drawing Sheets 1 and 2 and substitute therefore the attached Drawing Sheets 1 and 2.
Delete Columns 1-6 and substitute therefor the attached Columns 1-6.

This certificate supersedes the Certificate of Correction issued June 3, 2008.

Signed and Sealed this

Twenty-second Day of July, 2008

JON W. DUDAS
*Director of the United States Patent and Trademark Office*

(12) United States Patent
Schunk et al.

(10) Patent No.: US 7,112,902 B2
(45) Date of Patent: Sep. 26, 2006

(54) DRIVE APPARATUS FOR A PLASTICS PROCESSING MACHINE

(75) Inventors: Holger Schunk, Lendershausen (DE); Andreas Tschanter, Haustren (DE); Peter Kress, Aksleben (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 11/032,686

(22) Filed: Jan. 10, 2005

(65) Prior Publication Data
US 2005/0163641 A1    Jul. 28, 2005

Related U.S. Application Data

(63) Continuation of application No. PCT/DE03/02188, filed on Jul. 1, 2003.

(30) Foreign Application Priority Data
Jul. 9, 2002  (DE) .................. 102 30 876

(51) Int. Cl.
   *H02K 5/16* (2006.01)
(52) U.S. Cl. ................................. 310/90; 310/89
(58) Field of Classification Search .......... 310/89, 90; 366/83, 100; 425/558–261
   See application file for complete search history.

(56) References Cited

U.S. PATENT DOCUMENTS

| | | | |
|---|---|---|---|
| 5,679,384 A | * | 10/1997 | Emoto ................. 425/145 |
| 5,891,485 A | * | 4/1999 | Emoto ................. 425/145 |
| 6,632,009 B1 | * | 10/2003 | Meyer ................. 366/100 |
| 6,916,169 B1 | * | 7/2005 | Okada ................. 425/593 |
| 2002/0168445 A1 | * | 11/2002 | Emoto et al. ......... 425/558 |

FOREIGN PATENT DOCUMENTS

| | | |
|---|---|---|
| DE | 44 30 176 A | 2/1996 |
| DE | 199 09 307 A1 | 9/1999 |
| DE | 697 03 535 T2 | 6/2001 |
| DE | 100 28 066 C1 | 12/2001 |
| DE | 200 22 605 U1 | 1/2002 |
| EP | 1 182 027 A | 2/2002 |

OTHER PUBLICATIONS

"Ohne Getriebe", Plastverarbeiter, Zechner und Huethig Verlag GmbH, Speyer/Rhein, DE, vol. 53, No. 9, Sep. 2002, pp. 84-85, XP001116280 ISSN: 0032-1338.

* cited by examiner

Primary Examiner—Thanh Lam
(74) Attorney, Agent, or Firm—Henry M. Feiereisen

(57) ABSTRACT

A drive apparatus unit for components of a plastics processing machine includes a motor unit which is provided with a rotor having a hollow shaft, and a thrust bearing assembly for mounting a driveshaft of the plastics processing machine. The thrust bearing assembly is fully or partly disposed within the hollow shaft. By arranging the thrust bearing assembly within the hollow shaft, the size of the drive apparatus is reduced to the size of the motor unit.

22 Claims, 2 Drawing Sheets

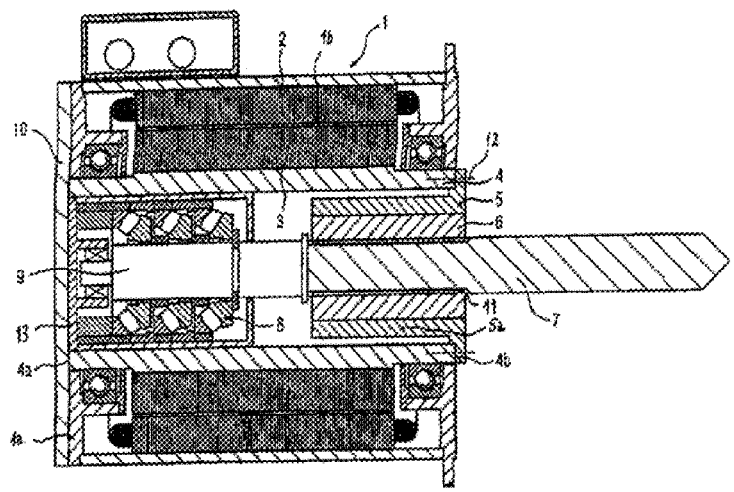

DRIVE APPARATUS FOR A PLASTICS PROCESSING MACHINE

CROSS-REFERENCES TO RELATED APPLICATIONS

This application is a continuation of prior filed copending PCT International application no. PCT/DE2003/002188, filed Jul. 1, 2003, which designated the United States and on which priority is claimed under 35 U.S.C. §120, and which claims the priority of German Patent Application, Serial No. 102 30 876.4, filed Jul. 9, 2002, pursuant to 35 U.S.C. 119(a)-(d).

BACKGROUND OF THE INVENTION

The present invention relates, in general, to a plastics processing machine, and more particularly to a drive apparatus for a plastics processing machine.

Nothing in the following discussion of the state of the art is to be construed as an admission of prior art.

German Pat. No. DE 100 28 066 C1 discloses an injection unit which is driven by two electric motors disposed in alignment to one another. One electric motor acts via a threaded nut upon the driveshaft of a screw to cause a translational movement, whereas the other electric motor acts upon a driving pin to cause a rotational movement of the driveshaft. A coupling is disposed between the motor shafts of both motors, with both motor shafts constructed as hollow shafts which are rotatably mounted on the housing of the injection unit. Respective bearings are provided on the respective hollow shafts.

German patent publication no. DE 199 09 307 A1 discloses a production machine with electric drives for use in the plastics industry. The production machine, e.g. an injection molding machine, extruder, or blow molding machine, includes an electric drive for moving a material feed element, with at least one of the electric drives being constructed as direct electric drive. The electric motor may be implemented as synchronous motor or asynchronous motor. A hollow shaft for receiving the driveshaft of an extruder screw for example projects through the rotor of the electric motor.

It would be desirable and advantageous to provide an improved drive apparatus which is compact and is constructed for easy disassembly, if need be, and yet is reliable in operation.

SUMMARY OF THE INVENTION

According to one aspect of the present invention, a drive apparatus for a plastics processing machine includes a motor unit having a hollow shaft for support of a rotor, a face plate attached to one end surface of the motor unit, and a thrust bearing assembly mounted to the face plate for support of a driveshaft of the plastics processing machine, wherein the thrust bearing assembly is disposed, at least partially, in the hollow shaft in coaxial relationship thereto.

The present invention resolves prior art problems by providing a drive apparatus which is limited in size and thus compact in view of the integration of the thrust bearing assembly in the rotor, and by constructing the thrust bearing assembly in such a way as to allow a simple dismantling of, for example, an extruder screw, when the plastics processing machine is an extruder. Through simple removal of the thrust bearing assembly from the hollow shaft, the extruder screw can be drawn through the hollow shaft, without requiring a disassembly of the motor itself from the plastics processing machine. This is advantageous not only when, e.g. the extruder screw becomes clogged so that repair work is necessary, but also for maintenance works. The accommodation of at least part of the thrust bearing assembly also protects the thrust bearing assembly from contamination.

According to another feature of the present invention, a transmission unit can be placed between the hollow shaft and the driveshaft for transmitting the torque from the rotor to the driveshaft unit, with the transmission unit including a flange having a tubular portion which projects into the hollow shaft, wherein the flange can be mounted to an end surface of the hollow shaft. As the thrust bearing is disposed in the motor unit and, in relation to the tip of the extruder screw, behind the transmission unit, the driveshaft may project into the hollow shaft. In this way, the torque can be transmitted directly onto the driveshaft of, e.g., the extruder shaft, and the thrust bearing can be constructed as plain abutment. This modular construction of the motor unit and the thrust bearing assembly permits a simple exchange of the bearing assembly, if needed for example in order to satisfy particular requirements such as high axial pressures. For example, a simple thrust bearing can easily be replaced by a tandem bearing which is able to resist much higher axial loads.

According to another feature of the present invention, the thrust bearing assembly can be detachably secured to a motor housing. An example of such securement involves a bolting of the thrust bearing assembly to the motor housing.

According to another feature of the present invention, a sealing element may be provided for the hollow shaft for protecting the thrust bearing assembly, positioned therebehind, against contamination.

According to another feature of the present invention, the transmission unit may include a bushing received in the flange in driving relationship with the driveshaft, e.g. via a tooth system. By configuring the transmission unit in this way, the bushing can be pulled out of the flange to allow a withdrawal of, e.g., the entire extruder screw rearwards through the flange and through the hollow shaft of the motor unit.

The integration of the thrust bearing assembly in the motor unit can be implemented in many types of different plastics processing units, e.g. extruder, injection molding machine, or blow molding machine, thereby considerably reducing repair or maintenance works.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a sectional view of a drive apparatus according to the present invention incorporated by way of example in an extruder for operating an extruder screw; and FIG. 2 is a schematic illustration of a detail of the drive apparatus of FIG. 1.

DETAILED DESCRIPTION OF PREFERRED EMBODIMENTS

The depicted embodiment is to be understood as illustrative of the invention and not as limiting in any way. It should also be understood that the drawings are not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a sectional view of a drive apparatus according to the present invention in the form of a direct drive for operating, for example, an extruder screw an extruder. The dive apparatus includes a motor unit 1 having a housing 1a to accommodate a stator 2 and a rotor 3 which interacts with the stator 2 via an air gap 1b. The rotor 3 is hereby supported on a hollow shaft 4 which extends across the interior of the housing 1a. As indicated by dashdot lines 12, a flange 5 is bolted to one end surface 4b of the hollow shaft 4 and has a tubular portion 5a that projects into the hollow shaft 4. The flange 5 forms part of a transmission unit whose other part is a bushing 6 which is received in force-fitting manner in the flange 5 for transmitting a torque from the motor unit 1 onto a driveshaft 7 of the extruder screw, with the driveshaft 7 disposed in force-fitting manner in the bushing 6. The driveshaft 7 is received in the bushing 6 for axial movement and is connected to the hollow shaft 4 via a tooth system 11. Thus, the torque of the hollow shaft 4 is transmitted via the flange 5 and the bushing 6 of the transmission unit to the driveshaft 7. An example of a currently preferred connection between the flange 5 and the bushing 6 as well as between the bushing 6 and the driveshaft 7 is shown in FIG. 2. As can be seen in FIG. 2, splined connections are provided between the flange 5 and the bushing 6 and between the bushing 6 and the driveshaft 7 and so configured as to allow a torque transmission as well as an axial displacement.

Disposed within the hollow shaft 4 on the flange-distal side 4a thereof is a thrust bearing assembly, generally designated by reference numeral 8 and providing an abutment for the driveshaft 7. The thrust bearing assembly 8 resists axial forces which are transmitted by the extruder screw onto the driveshaft 7. In the exemplified configuration shown in FIG. 1, the axial bearing assembly 8 is constructed as tandem bearing assembly with three bearing units. As a result, the thrust bearing assembly 8 obtains a greater mechanical strength and thus is able to resist higher axial loads while still retaining a relatively small bearing diameter. Rotatably supported within the thrust bearing assembly 8 in coaxial relationship with the hollow shaft 4 is a shaft stub 9 which juts out of the axial bearing assembly 8 towards the driveshaft 7 to terminate in an end surface for providing the abutment and axial support of the driveshaft 7.

On its side distal to the extruder screw, the motor unit 1 is closed by a face plate 10 which is secured to the housing 1a of the motor unit 1. The thrust bearing assembly 8 is mounted in the area of the interior space of the hollow shaft 4 to the face plate 10. The face plate 10 and the flange 5 together effectively protect the thrust bearing assembly 8 from both sides against contamination. Suitably, the end of the hollow shaft 4 adjacent to the face plate 10 is further sealed by a sealing element 13 to further assist the protection of the thrust bearing assembly 8 against contamination.

The drive apparatus according to the present invention allows easy replacement of the thrust bearing assembly 8, on one hand, and withdrawal of the extruder screw through the flange 5 and the hollow shaft 4 from the motor unit 1 in rearward direction. Replacement of the thrust bearing assembly 8 can be realized by detaching the face plate 10 from the housing 1a of the motor unit 1 to access the thrust bearing assembly 8 which can then be easily pulled out together with the shaft stub 9 from the interior space of the hollow shaft 4. The modular construction of the drive apparatus according to the present invention enables the application of this direct drive with the hollow shaft 4 for many different machine types that require different bearings.

In the event, the extruder screw should be removed from the extruder, for example because of clogging or for maintenance works, a withdrawal is normally possible only by pulling the extruder screw rearwards through its channel. As the thrust bearing assembly 8 can easily be extracted from the hollow shaft 4, the extruder screw can now be withdrawn through the hollow shaft 4, without any need to dismantle the motor unit 1 from the extruder. The bushing 6 can be pushed out of the flange 5 to allow the withdrawal of the extruder screw.

The modular construction of the motor unit 1 and thrust bearing assembly 8 has thus the advantage of realizing a simple extraction of the thrust bearing assembly 8 or the extruder screw or any other rotating component of the direct drive. Moreover, the drive apparatus according to the invention is compact as the thrust bearing assembly 8 is fitted within the hollow shaft 4 of the motor unit 4 so that the dimensions of the direct drive correspond to the dimensions of the motor unit 1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive apparatus for a plastics processing machine, comprising:
   a motor unit having a hollow shaft for support of a rotor and a shaft stub;
   a face plate attached to one end surface of the motor unit; and
   a thrust bearing assembly mounted to the face plate for direct support of the shaft stub which forms an abutment for a separate driveshaft of the plastics processing machine, said thrust bearing assembly being disposed, at least partially, in the hollow shaft in coaxial relationship thereto.

2. The drive apparatus of claim 1, wherein the thrust bearing assembly is disposed entirely in the hollow shaft.

3. The drive apparatus of claim 1, wherein the thrust bearing assembly includes a tandem bearing.

4. The drive apparatus of claim 1, wherein the driveshaft is disposed in axial alignment with the shaft stub.

5. The drive apparatus of claim 1, wherein the motor unit has a motor housing, said thrust bearing assembly being detachably secured to the motor housing.

6. The drive apparatus of claim 5, wherein the thrust bearing assembly is bolted to the motor housing.

7. The drive apparatus of claim 1, and further comprising a transmission unit placed between the hollow shaft and the driveshaft for support and propulsion of the driveshaft, said transmission unit including a flange having a tubular portion which projects into the hollow shaft, said flange being mounted to the hollow shaft.

8. The drive apparatus of claim 7, wherein the flange is bolted to an end surface of the hollow shaft.

9. The drive apparatus of claim 1, and further comprising a sealing element for sealing the hollow shaft to protect the thrust bearing assembly against contamination.

10. The drive apparatus of claim 7, wherein the transmission unit includes a bushing received in the flange in driving relationship with the driveshaft.

11. The drive apparatus of claim 10, wherein the bushing is operatively connected to the driveshaft via a tooth system.

12. The drive apparatus of claim 1, wherein the plastics processing machine is an extruder having an extruder screw, said driveshaft being operatively connected to the extruder screw.

13. The drive apparatus of claim 12, wherein the motor unit is constructed as synchronous motor as direct drive for the extruder.

14. The drive apparatus of claim 1, wherein the plastics processing machine is an injection molding machine having a clamping unit, said driveshaft being operatively connected to the clamping unit.

15. A set of modular elements for the construction of a drive apparatus for a plastics processing machine, said set comprising:
a motor unit including a housing defining an interior space, and a hollow shaft which extends across the interior space of the housing and supports a rotor interacting with a stator across an air gap;
a transmission unit, received in the hollow shaft at one end thereof, for transmitting a torque from the motor unit onto a driveshaft of a plastics processing machine;
a thrust bearing assembly, received in the hollow shaft at another end thereof in coaxial relationship thereto in axially spaced-apart relationship to the transmission unit, for directly supporting a shaft stub having an end portion to provide an abutment for the driveshaft; and
a face plate detachably secured to the housing in confronting relationship to the thrust bearing assembly.

16. The set of claim 15, wherein the transmission unit includes a flange detachably secured to the hollow shaft and a bushing received in the flange and constructed in driving relationship with the driveshaft.

17. An extruder, comprising:
an extruder screw; and
a drive apparatus for operating the extruder screw, said drive apparatus including a motor unit having a rotor with a hollow shaft in driving relationship with the extruder screw, a face plate attached to one end surface of the motor unit, and a thrust bearing assembly mounted to the face plate for direct support of a shaft stub which forms an abutment for the extruder screw said thrust assembly being disposed, at least partially, in the hollow shaft in coaxial relationship thereto.

18. The extruder of claim 17, and further comprising a transmission unit placed between the hollow shaft and the driveshaft for support and propulsion of the extruder screw, said transmission unit including a flange having a tubular portion which projects into the hollow shaft, said flange being mounted to the hollow shaft.

19. The extruder of claim 18, wherein the transmission unit includes a bushing received in the flange in driving relationship with the extruder screw.

20. The extruder of claim 19, wherein the bushing and the extruder screw cooperate via a tooth system.

21. The extruder of claim 17, wherein the extruder screw is partially received in the hollow shaft.

22. An injection molding machine, comprising a clamping unit for an injection mold; and a drive apparatus including a motor unit having a rotor with a hollow shaft, a face plate attached to one end surface of the motor unit, and a thrust bearing assembly mounted to the face plate for direct support of a shaft stub which forms an abutment for a driveshaft for the clamping unit, said thrust assembly being disposed, at least partially, in the hollow shaft in coaxial relationship thereto.

* * * * *